(12) United States Patent
Godfrey (10) Patent No.: US 9,507,030 B2
(45) Date of Patent: Nov. 29, 2016

(54) RADIATION DETECTOR

(71) Applicant: OPTASENSE HOLDINGS LIMITED, Farnborough, Hampshire (GB)

(72) Inventor: Alastair Godfrey, Farnborough (GB)

(73) Assignee: OPTASENSE HOLDINGS LIMITED (GB)

( * ) Notice: Subject to any disclaimer, the term of this patent is extended or adjusted under 35 U.S.C. 154(b) by 0 days.

(21) Appl. No.: 14/398,939

(22) PCT Filed: May 10, 2013

(86) PCT No.: PCT/GB2013/051207
§ 371 (c)(1),
(2) Date: Nov. 4, 2014

(87) PCT Pub. No.: WO2013/171460
PCT Pub. Date: Nov. 21, 2013

(65) Prior Publication Data
US 2015/0115166 A1  Apr. 30, 2015

(30) Foreign Application Priority Data
May 14, 2012  (GB) .................................. 1208418.2

(51) Int. Cl.
| G01T 1/18 | (2006.01) |
| G01T 1/16 | (2006.01) |
| G01H 9/00 | (2006.01) |
| G01T 5/08 | (2006.01) |

(52) U.S. Cl.
CPC ................. *G01T 1/16* (2013.01); *G01H 9/004* (2013.01); *G01T 1/18* (2013.01); *G01T 5/08* (2013.01)

(58) Field of Classification Search
CPC ..................... G01N 21/1702; G01N 29/2425; G01V 8/16
See application file for complete search history.

(56) References Cited

U.S. PATENT DOCUMENTS

| 4,598,202 A | 7/1986 | Koechner |
| 5,317,160 A | 5/1994 | Hilbert et al. |
| 2006/0210440 A1* | 9/2006 | Potyrailo et al. ......... 422/82.01 |
| 2008/0237485 A1 | 10/2008 | Beinhocker |
| 2011/0320147 A1 | 12/2011 | Brady et al. |
| 2013/0153790 A1* | 6/2013 | Clough et al. ............. 250/473.1 |

FOREIGN PATENT DOCUMENTS

| FR | 2933777 | 1/2010 |
| SU | 1222053 | 12/1996 |
| WO | WO 01/94979 | 12/2001 |
| WO | WO 2011/058322 | 5/2011 |
| WO | 2012/028845 | 3/2012 |

* cited by examiner

*Primary Examiner* — Yara B Green
*Assistant Examiner* — Hugh H Maupin
(74) *Attorney, Agent, or Firm* — McDonnell Boehnen Hulbert & Berghoff LLP (57) ABSTRACT

This application describes a radiation detector apparatus comprising: at least one optical fiber (104) suitable for distributed fiber optic acoustic/vibration sensing adjacent at least a first electrode (201) spaced apart from a second electrode (202) with a gas between the first and second electrodes.

29 Claims, 4 Drawing Sheets

RADIATION DETECTOR

FIELD OF THE INVENTION

This invention relates to methods and apparatus for detection of ionising radiation using optical fibres and especially to a distributed fibre optic radiation detector.

BACKGROUND OF THE INVENTION

There are various applications where it is wished to detect and/or monitor ionising radiation. For instance in the nuclear power industry it may be wished to monitor radiation levels at various locations within a power station. In many instances it is desirable that such monitoring can be done remotely and automatically. Likewise hospital radiology departments and other organisations that use radioactive sources may also have a need for installed radiation detectors.

Radiation detectors that are employed to provide monitoring in a given location typically tend to be gaseous ionisation detectors or solid state detectors such as semiconductor radiation detectors.

Gaseous ionisation detectors, such as the well known Geiger-Müller tube, typically comprise two closely spaced electrodes in a gaseous atmosphere with a potential difference applied to the electrodes which is below the breakdown voltage of the gas. In the presence of ionising radiation some of the atoms or molecules of the gas will be ionised and the resulting electrons and ions will allow a current to flow between the electrodes. The flow of a current can be detected and used as an indication of the presence of ionising radiation. The strength of the applied potential difference may be relatively high so as to lead to avalanche multiplication in the gas leading to a relatively large current pulse for each detection event.

Semiconductor radiation detectors operate by measuring the resulting current caused by ionising radiation creating electron-holes pairs in the detector material. Semiconductor detectors can provide fast response times but tend to be more expensive than gaseous ionisation detectors and may require cooling to reduce leakage current.

Such radiation detectors operate at a given location to measure ionising radiation at that location. In many applications multiple different detectors must be located at various locations to provide sufficient coverage, e.g. to provide sufficient areal coverage and/or provide monitoring at different locations within a facility. Each detector must be powered and typically must be able to communicate its readings to a remote location such as one or more control centres. There can therefore be relatively significant cost and complexity in installing such radiation detectors.

Embodiments of the present invention provide radiation detectors that mitigate at least some of these issues.

SUMMARY OF THE INVENTION

Thus according to the present invention there is provided a radiation detector apparatus comprising: at least one optical fibre suitable for distributed fibre optic acoustic/vibration sensing adjacent at least a first electrode spaced apart from a second electrode with a gas between the first and second electrodes.

In operation a potential difference will be applied between the first and second electrodes. The apparatus may therefore comprise circuitry for applying a potential difference between the first and second electrodes. The potential difference may be relatively high but below the breakdown voltage of the gas. In particular the potential difference may be high enough such that the presence of ionised atoms/molecules of gas causes avalanche multiplication. Thus, in the presence of ionising radiation, some atoms/molecules of the gas may be ionised leading to a cascade of charged particles between the electrodes, e.g. to create a spark.

The optical fibre is adjacent to the electrodes and is suitable for distributed acoustic sensing. Distributed acoustic sensing (DAS) is a known type of sensing where an optical fibre is deployed as a sensing fibre and interrogated with optical radiation (which herein shall be taken to mean visible light and also ultraviolet or infrared radiation). Radiation which is backscattered from within the optical fibre is detected and analysed to reveal information about acoustic stimuli acting on the optical fibre in different longitudinal sections of the sensing fibre, i.e. channels. Typically the interrogating optical radiation comprises one or more pulses of optical radiation and by analysing the backscatter radiation in one or more time bins the acoustic signals incident at one or more discrete sensing portions of the optical fibre can be detected. Thus the DAS sensor effectively acts as a linear sensing array of sensing portions of optical fibre which may be (but do not have to be) contiguous. The length of the sensing portions of fibre is determined by the characteristics of the interrogating radiation and the processing applied to the backscatter signals but typically sensing portions of the order of a few meters to a few tens of meters or so may be used. Note as used herein the term acoustic shall mean any type of pressure wave or mechanical disturbance that may result in a change of strain on an optical fibre and for the avoidance of doubt the term acoustic be taken to include ultrasonic and subsonic waves.

In embodiments of the present invention the optical fibre may be monitored using known distributed acoustic sensing techniques. As mentioned above in the presence of ionising radiation the gas may be ionised and, due to the applied potential difference between the electrodes, a cascade of charged particles, i.e. a spark, may result. The cascade will not only result in a flow of charged particles but will also generally produce a pressure wave in the gaseous medium, i.e. an acoustic wave. In other words, in use a spark caused by the presence of ionising radiation will generally be accompanied by a sharp sound that may be relatively intense. The distributed acoustic sensor can detect the acoustic wave generated by the cascade and thus provide an indication that discharge has occurred, thus indicating the presence of ionising radiation. The distributed acoustic sensor can in effect 'listen' for the sounds associated with a spark or cascade of charged particles. The number of detection events over time will give an indication of the level of ionising radiation at a given location.

The cascade of charged particles will also generate a thermal signal which can additionally or alternatively be detected by a distributed acoustic sensor. That is the spark will cause heating of the gas and electrodes. If the distributed acoustic sensor is located close, for instance coupled to, to one of the electrodes then at least some of the heat generated by the cascade will pass to the optical fibre, or at least the cladding/jacket layers. The spark may result in a relatively large change in temperature over a relatively short period of time. This will lead to an optical path length change resulting from modulation of the refractive index of the optical fibre and possibly any thermal expansion of the fibre material. Thus the relatively quick heating of the fibre optic/jacket material will result in a relatively quick strain like disturbance. This thermally induced path length change is on a time scale that can be detected by the distributed acoustic detector in addition to or instead of an acoustic pressure wave. In some instances detecting the thermally induced disturbance may provide more reliable detection of ionisation events.

One skilled in the art will appreciate that distributed acoustic sensors compare the signals returned from a given sensing portion of fibre in response to successive interrogations of the fibre in order to determine any disturbances acting of the fibre.

Such sensors can provide good detection of incident vibrations at acoustic frequencies. Such sensors typically however are less able to reliably detect low frequency strains and slow temperatures changes and indeed such low frequency effects may be seen as noise. It has been appreciated by the present inventor however that the heating effect caused by a cascade of charged particles will result in a relatively rapid heating followed by a slower cool down which create a reliable signature in the returns from the distributed acoustic sensors.

One skilled in the art will also appreciated that fibre optic based distributed temperature sensing (DTS) is another known technique which relies on detecting light which has been subjected to Brillouin and/or Raman scattering and analysing the light to determine the temperature. It is noted that most DTS systems require relatively long time averages to provide accurate measurements and that conventional DTS systems would typically lack the time resolution and also the temperature resolution to detect the thermal pulses produced by the cascade of charged particles.

Embodiments of the present invention thus use two spaced conductors to generate a cascade of charged particles in the presence of ionising radiation but use a fibre optic distributed acoustic sensor to detect a disturbance associated with the cascade, which may be due to an acoustic pressure wave or a thermal disturbance due to the cascade or both.

The fibre optic thus doubles as both the sensing fibre and the means of conveying the sensing data from the sensing location to a suitable control station.

In one embodiment there may be a plurality of electrode pairs spaced at intervals along the length of the optical fibre, each electrode pair comprising first and second electrodes. As mentioned above in DAS the fibre optic can provide a plurality of discrete sensing portions. The optical fibre could therefore be interrogated such that at least some electrode pairs are associated with different sensing portions of the fibre in use. This means that detection events associated with one electrode pair in one location can be discriminated from detection events associated with another electrode pair in a different location. Thus the same optical fibre can be used to separately monitor the detection events from electrode pairs in two different locations.

In one embodiment the first and second electrodes may be elongate electrodes that extend for at least part of the length of the fibre optic. The first and second electrodes may be greater than 100 m in length or greater than 500 m in length or greater than 1 km in length. This embodiment of the invention provides a distributed ionising radiation detector.

In this embodiment the first and second electrodes will, in use, have a potential difference applied to them as described previously and any location along the length of the electrodes (where there is a suitable gas between the electrodes) may lead to a cascade of charged particles in the presence of ionising radiation and thus create a stimulus at the relevant location. As mentioned previously the optical fibre can be interrogated to provide a plurality of discrete sensing portions and thus the disturbances associated with ionisation events can be detected in individual sensing portions of the optical fibre. This means that an arrangement of elongate electrodes and optical fibre can run through the area and in effect provide a plurality of individual detectors of ionising radiation. This embodiment of the present invention thus provides a very convenient method of detecting ionising radiation at a variety of locations. The distributed radiation detector according to the present embodiment can be readily installed and only requires a potential difference to be supplied to the electrodes (which can be done at one end remote from the area being monitored) and optical interrogation of end of the optical fibre, which again can be remote from the area being monitored. Thus there is no need for complex arrangements for supplying power to, or receiving data from, multiple point sensors.

The length of the sensing portions of the optical fibre can be determined by the properties of the interrogating optical radiation used and the subsequent analysis. For example an optical fibre may be interrogated to provide a plurality of contiguous sensing portions of the order of 10 m or so in length. Thus each 10 m section acts as a separate detector. Whilst the acoustic/thermal signals generated by each spark, i.e. ionisation event, will be detectable the stimulus is unlikely to be detectable in more than one sensing portion (depending on the arrangement) unless it occurs very near the boundary between sensing portions. Thus each sensing portion can provide a largely independent detector. As will be set out in more detail below the spatial size and location of the sensing portions within the optical fibre can also be varied in use by changing the properties of the interrogating radiation and/or analysis. This provides a degree of flexibility in operation of the distributed radiation detector that doesn't exist with fixed point sensors.

This embodiment does require the potential difference to be applied to electrodes which are relatively long in length, i.e. of the order of hundreds of meters or even kilometers in length. However no significant current flow is required and thus the power demands are relatively low.

It should be noted that in the event of an ionisation event leading to a cascade of charged particles there will be a current generated within the electrodes. It may be possible to detect such a current pulse but for electrodes of the lengths of hundreds of meters or more accurately detecting the small current pulse may be difficult without requiring the use of low resistance electrodes (which consequently high costs) and there may be significant problems with possible interference and signal-to-noise ratio. However, even if a current pulse could be reliably detected it is noted that detection of a current pulse would only indicate that there had been at least one ionising event somewhere along the length of the electrodes. For electrodes having a length of the order of 500 m or more this may give insufficient information about where the ionising event occurred. Also it would not be possible to discriminate between two events that occur at different locations but which generate simultaneous current pulses. Thus merely looking at the resulting current would provide no significant information about the location of the ionising radiation along the length of the electrodes.

With the embodiment of the present invention however the location of the ionising event can be determined to within the spatial resolution of the sensing portions of optical fibre and simultaneous event at different locations will be separately detected.

In some embodiments however the current generated in the electrodes may be monitored. By monitoring the total electric current flowing in the electrodes and also the ionisation events detected by the distributed fibre optic sensor it may be possible to determine some additional information about the ionising radiation and/or provide some calibration. For example, consider that at a first time the only source of ionisation events is background radiation. This may lead to detection events occurring at random locations along the length of the fibre and may generate a current of a first value in the electrode. If at a later time significantly more ionisation events are detected at a given location of the fibre, say from a few contiguous sensing portions of the fibre, this can indicate that a radiation source is irradiating that location. At this point the total current in the electrodes may have increased to a second value. This increase in current can be assumed to result from the increased ionisation events acting at the relevant section of the fibre. The increase in current thus gives another indication of the amount of ionisation events occurring in the given location. Thus measuring the total current may give an indication of the number of ionisation events happening along the length of the electrodes, and how that changes over time and the distributed fibre optic sensor allows localised of where the ionisation events are occurring and another measure of the number of events.

In one embodiment the optical fibre may be coupled to at least one of the first or second electrodes, i.e. mechanically coupled. This can improve the coupling of the acoustic stimulus produced by the cascade of charged particles to the optical fibre and/or the flow of heat generated by the cascade from the electrode to the optical fibre. Thus for instance the optical fibre, which will typically be arranged in at least one cladding or jacket layer, may be attached to say the first electrode. An electrode which is coupled to the optical fibre is preferably arranged to extend along the same general direction as the optical fibre.

The optical fibre may have a coating or barrier layer to protect it from the electrical discharge that occurs in the presence of ionising radiation. The optical fibre may also be coated in a material which protects the optical fibre from damage due to ionising radiation.

The material between the optical fibre and the electrode may be selected to have desired thermal properties, for instance to provide good heat transfer to the optical fibre jacket, e.g. relatively high conductivity and/or thermal diffusion, and/or in some instances a relatively high coefficient of thermal expansion (although the modulation of refractive index caused by heating of the fibre is likely to be a greater effect than any thermal expansion).

In one embodiment the first and/or second electrode may be arranged within a cable structure with the optical fibre. In other words a fibre optic cable structure may include at least one of the first and second electrodes and may include both. Where the cable includes both the first and second electrode the electrodes may be separated, in at least some sections, by a porous material to allow gas between the electrodes and/or there may be at least one void between the electrodes that can fill with gas. In other words the cable may be designed such that gas can permeate or be contained between the first and second electrodes. In one embodiment the first and second electrodes may run through a series of cavities that, in use, contain gas. The cavities may be arranged to have a size that leads to a particular resonance frequency. In the event of a pressure wave caused by a spark the cavity may resonant at the resonance frequency. Detecting the resonance frequency may help in detecting an ionisation event.

At least one of the first and second electrodes may comprise a conductive wire. In one embodiment however at least one electrode may comprise a conductor with an arcuate cross section. For example the first electrode may be arranged with an arcuate cross section and arranged to at least partially surround the second electrode. The first electrode may be formed as a tube. In one embodiment the second electrode may also have an arcuate cross section and may be arranged to at least partially surround the optical fibre. The second electrode may comprise a tube.

The gas separating the first and second electrodes may conveniently be air. Thus the first and second electrodes may be separated leaving an air gap that may be open to the environment to allow air between the electrodes in use. Additionally or alternatively the first and second electrodes may be separated, at least in place, by an insulator material which is porous to air but which allows the cascade of charged particles in use.

In some embodiments however, especially where the first and second electrodes form part of a cable structure the electrodes may be arranged within a sealed environment. In such embodiments the gas may be air that was encapsulated during fabrication of the cable structure but in other embodiments a different gas be used if preferred, for instance a gas that is more readily ionised than air and/or produces a greater acoustic signal when a ionisation induced discharge occurs. In a sealed environment the gas, whether air or some other gas, may be pressurized. In a sealed environment however the ionising radiation will have to pass the barrier layer to reach the gas to cause ionisation to be detected. The material used in the structure to seal the gas from the environment may be chosen to have minimal effect on the ionising radiation, i.e. to allow a significant amount of ionising radiation to pass into the contained gas. However depending on the type of radiation to be detected, e.g. alpha radiation, beta radiation or gamma radiation, the material may be tuned to provide a degree of filtering or modulation for ionising radiation reaching the gas.

In general therefore there may be at least one barrier layer between the gas separating the first and second electrodes and a direction of incidence for ionising radiation. The barrier layer may have properties tuned to filter particular types of ionising radiation. For instance the barrier layer may be sufficiently thick to absorb alpha particles or block low energy radiation.

The barrier may vary along the length of the electrodes and optical fibre. In a first section there may be no significant barrier layer whereas in a second section there may a barrier layer which prevents alpha particles say from reaching the gas separating the electrodes. If the first and second sections lie in different sensing portions of the optical fibre the acoustic/thermal events detected from the first section may indicate the total amount of ionising radiation whereas the signal returns from the second section would represent just ionisation events from non-alpha particle radiation sufficiently energetic to pass the barrier layer.

As mentioned above in some embodiments the first and second electrodes may pass through various cavities. In one embodiment at least some cavities are tuned to have a different resonance frequency to one another. At least some cavities of different resonance frequency may have different barrier materials. In this way several cavities may be arranged within a single sensing portion of the DAS sensor with each cavity having a different filter material. Detecting an acoustic signal due to a cascade discharge indicates an ionisation event and detecting an associated resonant frequency may indicate the particular cavity within which the event occurred. This can potentially give some information about the characteristics of the ionising radiation.

The embodiments described above will detect ionising radiation that directly ionises the relevant gas. In some embodiments however the detector apparatus may additionally or alternatively be arranged to detect radiation via secondary ionisation. Thus the sensor may comprise a material that responds to incident radiation by emitting ionising radiation. For example to detect neutrons, which may not cause direction ionisation of the gas, the apparatus may comprise a neutron absorbing material which emits ionising radiation in response to neutron absorption. In this way any incident neutrons may be absorbed by the neutron absorbing material, i.e. a material with a high neutron absorbing cross-section, resulting in secondary emission of ionising radiation from the neutron absorbing material. This secondary ionising radiation can cause direct ionisation of the gas and thus lead to a spark which can be detected as described previously. A suitable neutron absorbing material may be Boron-10 but others are known.

To isolate the events due to neutrons from radiation that cause direct ionisation the apparatus may comprise, over at least part of the sensor, a shielding layer that substantially blocks or attenuates other forms of ionising radiation. In some embodiments the neutron absorbing material may comprise at least part of the shielding layer.

Again the apparatus may be arranged with one or more sections responsive to neutrons, e.g. with a shielding layer and neutron absorbing material and one or more sections responsive to directly ionising radiation, i.e. without the shielding layer and neutron absorbing material, with each section corresponding to different sensing portions of the DAS sensor to allow the same apparatus to be used to detect neutrons and directly ionising radiation.

The embodiments of the present invention provide a radiation detector comprising the apparatus described above, an interrogator unit coupled to the optical fibre for performing distributed acoustic sensing on the optical fibre and circuitry for applying the potential difference to the first and second electrodes.

It will be clear from the foregoing however that whilst the techniques of distributed acoustic sensing may be used (in terms of interrogating the optical fibre with pulses of optical radiation, detecting radiation backscattered and analysing such radiation for changes due to any path length changes), the detection may look for characteristic signatures due to the thermal events associated with the cascade of charge particles, either in addition to or instead of detecting acoustic pressure waves. Thus for the avoidance of the doubt the term distributed acoustic sensor as used herein refers to a distributed fibre optic sensor suitable for distributed acoustic sensing, i.e. one responsive to relatively fast path length changes of the sensing fibre (however generated).

The interrogator unit is configured to launch interrogating optical radiation into the optical fibre and to detect optical radiation backscattered from within the fibre. The interrogator unit may also be configured to process the detected backscattered radiation to produce a measurement signal for each of a plurality of sensing portions of optical fibre, the measurement signal indicating the signals detected by said sensing portion.

The apparatus may also comprise a processor for processing said measurement signals to detect signals associated with ionisation events. For example the processor may analyse the signals to detect signals characteristic of sparks or cascade discharges, i.e. relatively intense, short duration acoustic signals, possibly with a characteristic frequency or spread of frequency and/or a rapid spike due to rapid heating followed by a ramp down due to cooling.

In use the circuitry for applying the potential difference to the first and second electrodes may be arrange to modulate the applied potential difference over time.

The potential difference may be periodically turned off or reduced to a low level which is insufficient to cause a cascade of charged particles in response to an ionisation event. It will be appreciated that the DAS sensor will be responsive not only to the disturbances generated by ionisation events but also to other incident acoustic signals. The characteristic signature of the signals produced by ionisation events, i.e. relatively intense, short duration acoustic signals and/or with a spike in the detected signal due to rapid heating followed by a slower ramp back to baseline due to cooling, possibly with a characteristic frequency or spread of frequency, may in some embodiments be quite distinctive from any background acoustic signal. In this case the signals due to ionisation events may be readily identified and discriminated from any background noise signals incident on the optical fibre of the DAS sensor. However in at least some embodiments it may be wished to determine the background noise acting on the fibre in order to improve detection of signals due to ionisation events. By periodically reducing the potential difference between the first and second electrodes so as to substantially stop any stimulus in response to ionising radiation, the background noise can determined directly and used in subsequent identification of acoustic signals due to ionisation events.

Additionally or alternatively the potential difference between the first and second electrodes may be modulated over time so to determine spectroscopic information about any ionising radiation present. By varying the potential difference between the electrodes the amount of ionisation required before a cascade discharge occurs is also varied. For example a relatively low energy particle may only ionise a few gas molecules/atoms as it passes through the gas. With a high applied potential difference this may lead to a cascade of charged particles as the few ions/electrons are accelerated to cause avalanche multiplication. At a lower applied potential difference a low energy particle may not produce sufficient ionised particles to create a cascade. Thus by varying the potential difference and monitoring for the number of detected signals due to cascade discharges information about the energy content of the radiation may be determined.

The invention also relates to a method of detecting ionising radiation. Thus is another aspect of the present invention there is provided a method of radiation detection comprising: applying a potential difference between first and second electrodes separated from one another in a gas, wherein the potential difference is sufficient such that ionisation of the gas causes a cascade of charged particles between the electrodes and, interrogating an optical fibre deployed adjacent said first and/or second electrodes to provide a distributed acoustic sensor; and monitoring said distributed acoustic sensor for signals associated with a cascade of charged particles.

The method of this aspect of the invention provides all of the same benefits and advantages as the first aspect of the invention and can be operated in all of the same embodiments.

In general embodiments of the present invention provide a distributed radiation detector comprising first and second elongate electrodes spaced apart from one another and a distributed acoustic sensor comprising a sensing optical fibre deployed along the path of said first and second elongate electrodes.

The invention also relates to the use of a distributed acoustic sensor to detect signals generated by a spark between two electrodes to detect ionising radiation.

DESCRIPTION OF THE DRAWINGS

The invention will now be described by way of example only with respect to the following drawings, of which.

DESCRIPTION OF THE INVENTION

The present invention applies distributed acoustic sensing techniques to the detection/monitoring of ionising radiation.

Figure 1:
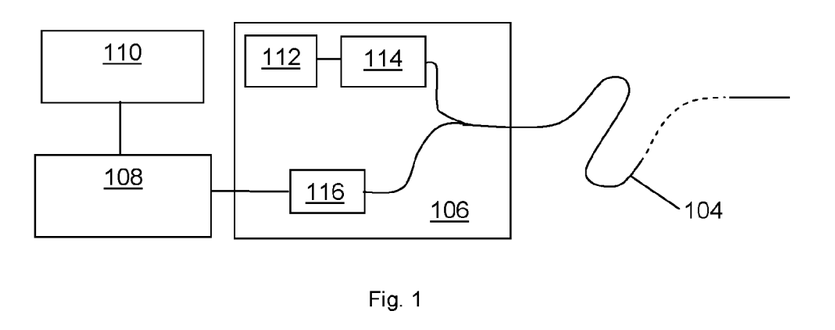
FIG. 1 illustrates a conventional distributed acoustic sensor.

FIG. 1 shows a schematic of a conventional distributed fibre optic sensing arrangement. A length of sensing fibre 104 is removably connected at one end to an interrogator 106. The output from interrogator 106 is passed to a signal processor 108, which may be co-located with the interrogator or may be remote therefrom, and optionally a user interface/graphical display 110, which in practice may be realised by an appropriately specified PC. The user interface may be co-located with the signal processor or may be remote therefrom.

The sensing fibre 104 can be many kilometers in length and can be, for instance 40 km or more in length. The sensing fibre may be a standard, unmodified single mode optic fibre such as is routinely used in telecommunications applications without the need for deliberately introduced reflection sites such a fibre Bragg grating or the like. The ability to use an unmodified length of standard optical fibre to provide sensing means that low cost readily available fibre may be used. However in some embodiments the fibre may comprise a fibre which has been fabricated to be especially sensitive to incident vibrations. In use the fibre 104 is deployed in an area of interest to be monitored.

In operation the interrogator 106 launches interrogating electromagnetic radiation, which may for example comprise a series of optical pulses having a selected frequency pattern, into the sensing fibre. The optical pulses may have a frequency pattern as described in GB patent publication GB2,442,745 the contents of which are hereby incorporated by reference thereto, although DAS sensors relying on a single interrogating pulse are also known and may be used. Note that as used herein the term "optical" is not restricted to the visible spectrum and optical radiation includes infra-red radiation and ultraviolet radiation. As described in GB2,442,745 the phenomenon of Rayleigh backscattering results in some fraction of the light input into the fibre being reflected back to the interrogator, where it is detected to provide an output signal which is representative of acoustic/mechanical disturbances in the vicinity of the fibre. The interrogator therefore conveniently comprises at least one laser 112 and at least one optical modulator 114 for producing a plurality of optical pulses separated by a known optical frequency difference. The interrogator also comprises at least one photodetector 116 arranged to detect radiation which is Rayleigh backscattered from the intrinsic scattering sites within the fibre 104. A Rayleigh backscatter DAS sensor is very useful in embodiments of the present invention but systems based on Brillouin or Raman scattering are also known and could be used in embodiments of the invention.

The signal from the photodetector is processed by signal processor 108. The signal processor conveniently demodulates the returned signal based on the frequency difference between the optical pulses, for example as described in GB2,442,745. The signal processor may also apply a phase unwrap algorithm as described in GB2,442,745. The phase of the backscattered light from various sections of the optical fibre can therefore be monitored. Any changes in the effective optical path length within a given section of fibre, such as would be due to incident pressure waves causing strain on the fibre or a local rapid heating of the fibre optic cable causing a modulation of refractive index, can therefore be detected.

The form of the optical input and the method of detection allow a single continuous fibre to be spatially resolved into discrete longitudinal sensing portions. That is, the acoustic signal sensed at one sensing portion can be provided substantially independently of the sensed signal at an adjacent portion. Such a sensor may be seen as a fully distributed or intrinsic sensor, as it uses the intrinsic scattering processed inherent in an optical fibre and thus distributes the sensing function throughout the whole of the optical fibre. The spatial resolution of the sensing portions of optical fibre may, for example, be approximately 10 m, which for a continuous length of fibre of the order of 40 km say provides 4000 independent acoustic channels or so deployed along the 40 km of fibre.

DAS has been employed in many environments for instance for perimeter monitoring. Embodiments of the present invention use DAS in enabling a radiation detector.

Figure 2:
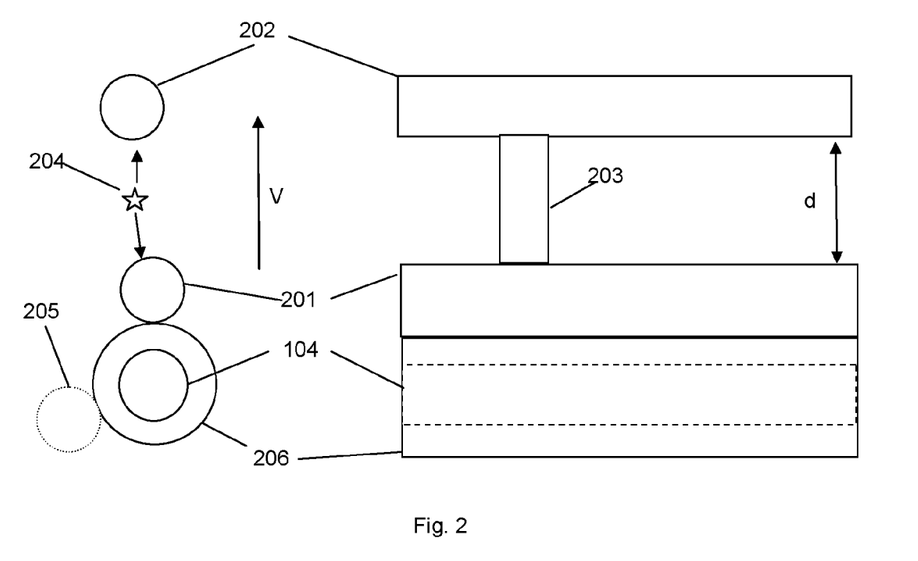
FIG. 2 illustrates an embodiment of a radiation detector according to the present invention.

The principle of the radiation detector will be illustrated with respect to FIG. 2. FIG. 2 shows a sectional view on the left and a side view on the right of a radiation detector according to one embodiment of the invention. FIG. 2 shows an optical fibre 104, which is a sensing optical fibre such as described above in relation to FIG. 1, adjacent a first electrode 201. The first electrode is separated by an air gap d from a second electrode 202. Electrodes 201 and 202 may be any suitable conductive electrodes, for instance conductive wires or the like. The electrodes are held apart by the desired distance d by a supporting structure, such as insulating spacers 203 and the space between the electrodes in use is filled with a gas. In some embodiments the gap between the electrodes may be open to the local environment and in use the gap may therefore fill with air.

In use a potential difference, V, is applied to electrodes 201 and 202 by suitable circuitry (not shown in FIG. 2). The applied potential difference is relatively high but below the breakdown voltage of the relevant gas, in this instance air. The potential difference applied may, for example, be of the order of 3 kV/m (based on the separation d of the electrodes). In the absence of ionising radiation the applied voltage is thus insufficient to cause breakdown of the gas.

However in the presence of ionising radiation the ionising radiation may, result in an ionisation event 204, where one or more atoms or molecules of the gas are ionised. The resulting electrons and ions will be accelerated by the relatively high potential difference and may cause avalanche multiplication. A cascade of charge particles may therefore flow to the electrodes (depending on the relative polarity). In effect the ionising radiation ionises sufficient gas atoms/molecules to result in a cascade discharge, e.g. a spark. This will result in a momentary flow of current but will also create an acoustic wave in the gas. This acoustic stimulus will be incident on the sensing optical fibre and can be detected as an acoustic stimulus as described above.

The cascade of charged particles, i.e. the spark, will cause heating of the electrode 201 in the vicinity of the spark. At least some of this heat may flow to the optical fibre 104 and result in a relatively rapid change in path length, e.g. from modulation of the refractive index of the optical fibre. This may result in a detectable change in the measurement signal from the optical fibre in a similar fashion as if a sudden strain been applied. The heating will be relatively rapid, say of the order of 10 ms or so. The fibre will then cool over a period of say half a second or so. This effect can produce a characteristic signature in the measurement signal from the DAS sensor with a rapid change followed by a slow ramp back to the previous level which can also be detected. Thus in addition to, or instead of, detecting a sudden intensity signal in response to an acoustic pressure wave, the signal due to rapid heating caused by the spark may be detected.

Embodiments of the present invention thus use the DAS sensor to effectively monitor for sparks resulting for gas discharge events in the presence of ionising radiation. The number of such events detected in each sensing portion over time can be used to give an indication of the amount of ionising radiation at each sensing portion of optical fibre.

To maximise the acoustic signal detected by the optical fibre 104 the fibre may be coupled to at least one electrode. As shown in FIG. 2 the optical fibre is coupled to electrode 201 and spaced apart from electrode 202, although in another embodiment the second electrode could be positioned 205 so as also to be coupled to the optical fibre. Coupling the fibre to one of the electrodes will also maximise the heat transfer from the electrode to the fibre due to the spark and thus maximise the thermal signature.

To protect the optical fibre from the spark the optical fibre may be disposed in a coating 206 (which may be part of the normal jacket material for an optical fibre or an additional protective layer). The coating 206 may be chosen to protect the fibre but also provide desired thermal properties, such as high thermal diffusion or conductivity.

Figure 3:
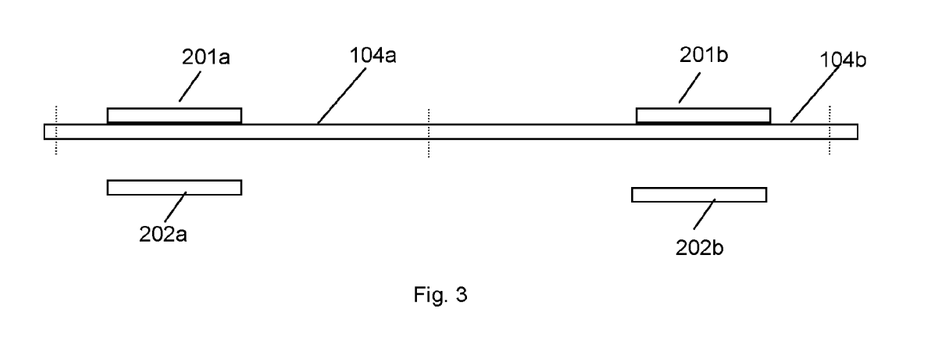
FIG. 3 illustrates a radiation detector having a plurality of pairs of electrodes.

The optical fibre may be deployed adjacent to a plurality of pairs of first and second electrodes as shown in FIG. 3, which illustrates the optical fibre running past a first pair of electrodes 201a and 202a and a second pair of electrodes 201b and 202b. The DAS sensor may be arranged so that at least some of the electrode pairs lie in different sensing portions. Thus electrode pair 201a and 202a lie in a first sensing portion 104a and electrode pair 201b and 202b lie in a second sensing portion 104b.

Figure 4:
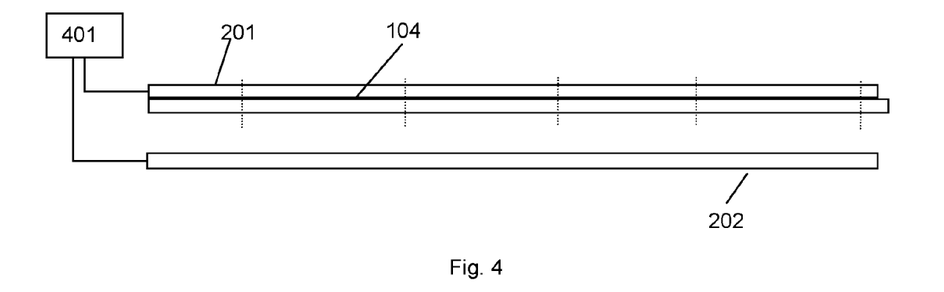
FIG. 4 illustrates an embodiment of a distributed radiation detector according to the present invention.

However in some embodiments the electrodes 201 and 202 may be elongate electrodes of the order of hundreds of meters or more in length. FIG. 4 shows an embodiment where the optical fibre 104 has a first electrode 201 and a second electrode 202 running along a significant portion of its length. The sensing fibre may be interrogated to provide a plurality of sensing portions as discussed above. Each sensing portion will detect acoustic events resulting from a cascade discharge within that sensing portion. In this way the location of the various ionisation events can be detected to within the spatial resolution of the sensing portions of optical fibre. As mentioned above DAS can be employed on optical fibres of the order of up to 40 km or more in length with spatial sensing portions of the order of 10 m or so in length, providing 4000 sensing channels.

To provide radiation sensing at a series of locations, for instance within an facility an optical fibre with elongate electrodes, such as conductive wires (e.g. normal copper wire or the like) may be laid in a desired pattern through the building. The optical fibre and electrodes may be arranged to encircle key locations. In areas where increased sensitivity is required the optical fibre and electrodes may be arranged to have multiple loops so as to maximise the changes of detection. The fibre and electrodes may also be arranged in patterns to vary the effective spatial resolution of the sensor, for instance if the fibre is interrogated to provide sensing portions of 10 m in length and a portion of optical fibre of at least 10 m in length is arranged within a 1 m distance in a given location then the effective spatial resolution of that portion will be 1 m.

Depending on the type of radiation being detected the optical fibre and electrodes may be located attached to or within wall structures, such as within cavity walls, arranged to run on or under floors and/or through ceiling spaces or attached to roves.

A single fibre of the order of a few kilometers in length along with similar length electrodes can provide a significant degree of coverage but only requires the interrogator unit 106 to be connected at one end such as shown in FIG. 1. The voltage difference can also be applied at one end of each of the first and second electrodes by suitable circuitry 401 as shown in FIG. 4. Thus the combined optical fibre and electrodes may be run from a suitable control room which houses the interrogator unit 106 and the circuitry 401.

Whilst embodiments of the present invention thus may require a relatively high potential difference to be applied to conductors which are many hundreds of meters or even kilometers in length there is no significant current required to be carried and thus the power requirements are relatively modest.

Clearly the sensors should be deployed to prevent accidental short circuit and the circuitry 401 may have current limiting circuitry to prevent significant current being drawn.

Figure 5:
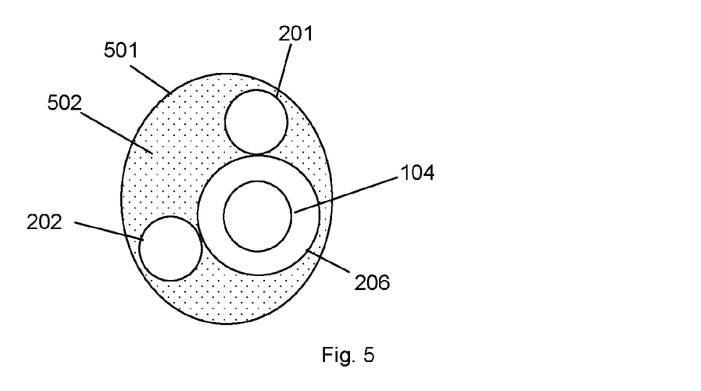
FIG. 5 shows a first cable structure according to an embodiment of the invention.

The electrodes and optical fibre may conveniently be formed into a cable structure that supports the electrodes and optical fibre and provides structural integrity and protection. In one embodiment, as shown in FIG. 5, an arrangement such as shown in FIG. 2 with optical fibre 104 coupled to electrodes 201 and 22 located within a suitable outer jacket material 501 which may be filled with a porous material 502. The porous material 502 could be a structure with many voids or gaps permitting gas to enter. The porous material should be generally insulating such that the potential difference between the electrodes is maintained by have sufficient pores as to allow a spark discharge in the presence of ionising radiation.

The jacket material should preferably not block the ionising radiation it is desired to detect and thus in some instances may be relatively thin and/or perforated to allow radiation such as alpha particles to reach the gas.

Figure 6:
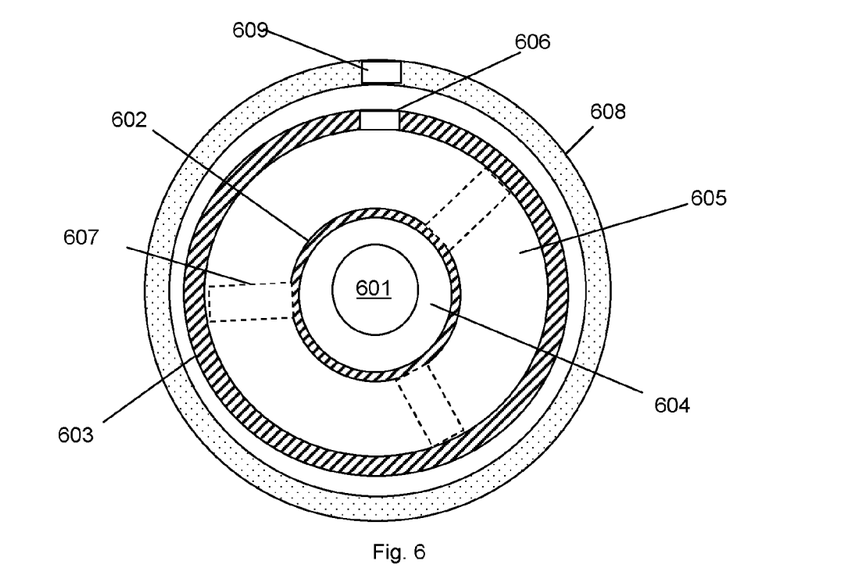
FIG. 6 a second cable structure according to an embodiment of the invention.

In another embodiment, as shown in FIG. 6, the first and second electrodes may be arranged as substantially arcuate conductors at least partly surrounding one another and/or the optical fibre.

FIG. 6 shows an optical fibre 601 surrounded by a tubular first conductor 602 which are both surrounded by a second tubular conductor 603. The optical fibre 601 may be protected by a protective jacket material 604 to protect against spark discharge. The jacket material may be chosen to provide desired thermal properties, i.e. conduction of heat to the optical fibre 601, to maximise the thermal signature detected by fibre 601. The space 605 between the first and second electrodes 602 and 603 may be largely void or may be filled with a porous material as described above. In some embodiments the gas within the cable structure is sealed from the environment. This allows a different gas to air to be used and/or allows the gas to be pressurised. In other embodiments however there is a flow path from the interior of the cable structure to the outside for instance via one or more holes 606 in the second electrode 606. To help maintain structural integrity there may be one or more support structures 607.

The radiation detector according to this aspect of the invention operates as before, ionising radiation reaching the gas may cause ionisation events with an associated acoustic/thermal signal which can be detected. It will be appreciated that the presence of second electrode 603 surrounding the air gap may prevent some radiation from reaching the gas. The radiation detector may therefore inherently only detect ionising radiation above a certain energy. In other embodiments however the second electrode may be perforated in many places to provide entry windows for radiation.

The structure may comprise at least one outer jacket layer 608 which may protect the sensor structure and/or which may be arranged to provide further filtering by only permitting certain types or energies of ionising radiation to pass. Again however the outer jacket may be provided with one or more holes 609 to permit air flows and/or present entry windows for radiation.

The coating material may be varied along the length of the cable structure such that different locations are sensitive to different types/energies of radiation. The coating may be varied in sections of the order of the length of the sensing portions of fibre such that different sensing portions respond differently. In one embodiment however the air gap 605 may be divided into a series of cavities along the length of the cable structure with the length of each cavity being tuned to give a different resonant frequency. A spark in a cavity may then produce an acoustic signal that has a relatively strong component at the resonant frequency of the cavity. The different coatings may vary in correspondence with the different cavities.

The circuitry for applying a potential difference 401 may also be arranged to modulate the applied potential difference over time.

The potential difference may be periodically turned off or reduced to a low level which is insufficient to cause a cascade of charged particles in response to an ionisation event. By periodically reducing the potential difference between the first and second electrodes so as to substantially stop any stimulus in response to ionising radiation, the background noise can determined directly and used in subsequent identification of acoustic signals due to ionisation events.

The potential difference between the first and second electrodes may also be modulated over time so to determine spectroscopic information about any ionising radiation present. By varying the potential difference between the electrodes the amount of ionisation required before a cascade discharge occurs is also varied. Thus by varying the potential difference and monitoring for the number of acoustic signals due to cascade discharges information about the energy content of the radiation may be determined.

Figure 7:
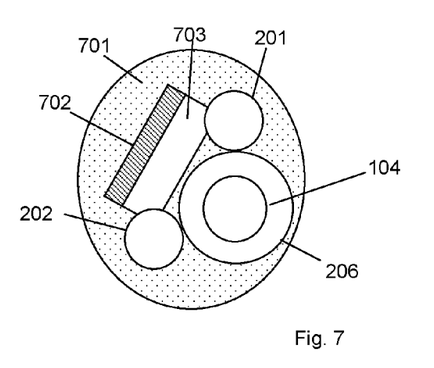
FIG. 7 illustrates an embodiment suitable for detecting neutrons.

The embodiments described above will detect ionising radiation that directly ionises the relevant gas. In some embodiments however the detector apparatus is arranged to detect radiation via secondary ionisation such as shown in FIG. 7. FIG. 7 illustrates a sensor suitable for detecting neutrons, which may not cause direction ionisation of the gas. In addition to the optical fibre 104 and first and second electrodes 201 and 202 the apparatus may comprise a neutron absorbing material 703 which emits ionising radiation in response to neutron absorption. The neutron absorbing material is arranged next to an air gap 702 in a shielding material 701. The air gap contains a gas between the electrodes. The shielding material blocks directly ionising radiation but permits the passage of neutrons. Any incident neutrons may be absorbed by the neutron absorbing material 702, i.e. a material with a high neutron absorbing cross-section such as Boron-10, resulting in secondary emission of ionising radiation from the neutron absorbing material. This secondary ionising radiation can cause direct ionisation of the gas and thus lead to a spark which can be detected as described previously.

To illustrate the principles of embodiments of the present invention an optical fibre having an acrylate jacket material was coated with silver (using a silver DAG coating) to form a first electrode as an outer layer of the fibre optic (similar to elements 601, 604 and 602 illustrated in FIG. 6). The fibre/electrode combination was then arranged in air near to a second electrode which was a copper conductor. A potential difference of 5 kV was applied between the first and second electrodes and the distance between the electrodes was set to a separation just greater than a separation which resulted in spontaneously electrical discharge. In other words the electrodes were arranged so that the electric field around the fibre was just below the breakdown voltage of the air. In this experimental arrangement the separation between electrodes was around 3 mm.

A 0.9 µCi source of Am 241 was used to supply 5.5 MeV alpha radiation. When the source was in close proximity to the strong electric field near the fibre, the ionisation trails of the alpha particles were enough to trigger electrical discharges. The distance and angle of the source was kept such that the discharge rate remained low.

The optical fibre was interrogated using a distributed acoustic sensing interrogator unit. The DAS interrogated unit repeatedly interrogated the fibre with single pulses of optical radiation and detected radiation which was Rayleigh backscattered from within the fibre and generated a measurement signal based on intensity variations between successive interrogations.

Figure 8:
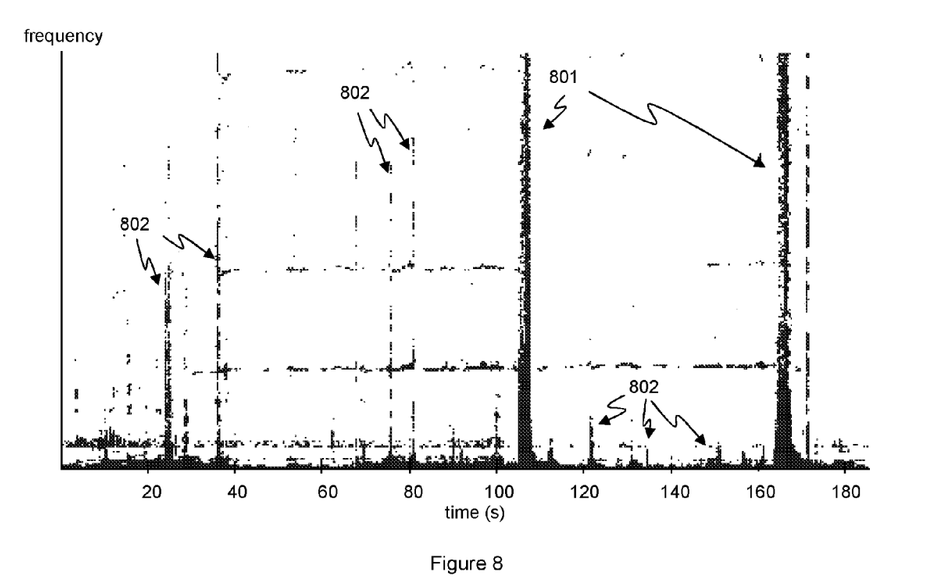
FIG. 8 illustrates a spectrogram recording using a radiation detector according to an embodiment of the present invention.

FIG. 8 shows a spectrogram of a three minute recording taken from fibre being exposed to ionising radiation-induced spark discharging. At 106 seconds and 165 seconds into the recording, the copper conductor was brought too close to the fibre, resulting in continuous spontaneous electrical discharge. The spikes in frequency labelled 801 where thus the result of such continuous discharge.

It can be seen however that there are a number of other spikes in the spectrogram, at least some of which are labelled 802, which are due to radiation induced discharge.

It can thus be seen that the disturbances created by the radiation induced cascade of charged particles can clearly be detected in the signal returns from a distributed acoustic sensor.

Figure 9A:
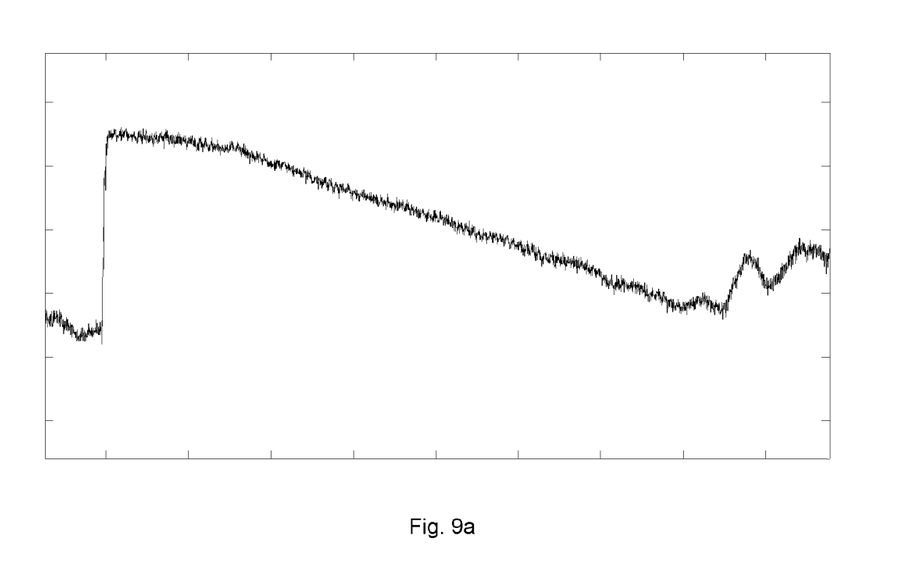
FIGS. 9a and 9b illustrate two time series of recorded spark discharges.
Figure 9B:
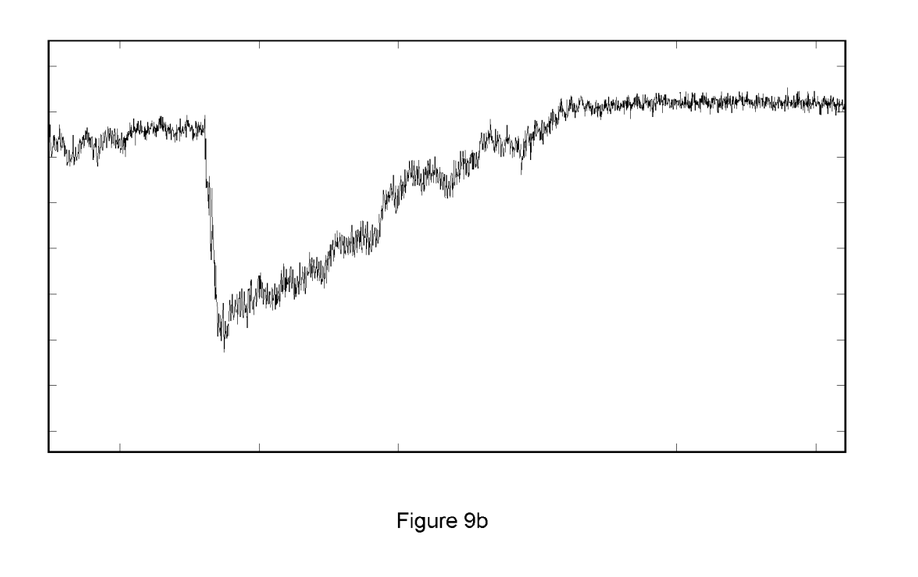

FIGS. 9a and 9b illustrates time series data from typical spark discharges. These illustrate the power/intensity of backscattered light detected from a given sensing channel against time, with successive samples being acquired at a sample rate of 2.5 kHz. It can be seen that there is a noticeable rapid change in intensity of the detected backscatter with a slower ramp back to baseline.

The rise time to half maximum is about 10 ms and the decay time constant is about 0.5 seconds. These spark signatures seem to predominantly originate from the thermal input, i.e. fast heat up to maximum followed by slow decay back to room temperature. The period of 10 ms or so for the heating is consistent with what may be expected for thermal diffusion of an instantaneous energy pulse to reach the centre of the optical fibre. Heat will conduct along the fibre, but this should not change the amplitude of the signal significantly since the total expansion should remain roughly the same (both thermal expansion and change in temperature are linear to a first approximation).

In terms of cooling heat will be lost to the surroundings by loss to the air by conduction/convection and by radiation. Tests were conducted on the coated fibre by heating using a heat source for a few hundred microseconds and observing the frequency change over time as the fibre cooled. A cooling period of a few seconds was observed. Thus the time series detected for the spark discharges is consistent with heating and cooling of the optical fibre due to the discharge.

It can therefore be seen that discharges between two electrodes caused by ionising radiation can be detected by using distributed acoustic sensing techniques on an optical fibre located in the vicinity of, and preferably coupled to, at least on the electrodes.

The invention has been described with respect to various embodiments. Unless expressly stated otherwise the various features described may be combined together and features from one embodiment may be employed in other embodiments.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A radiation detector apparatus comprising: at least one optical fibre suitable for distributed fibre optic acoustic/vibration sensing adjacent at least a first electrode spaced apart from a second electrode with a gas between the first and second electrodes.

2. A radiation detector apparatus as claimed in claim 1 comprising circuitry for applying a potential difference between the first and second electrodes.

3. A radiation detector apparatus as claimed in claim 2 wherein the potential difference applied is high enough such that the presence of ionised atoms/molecules of gas causes avalanche multiplication.

4. A radiation detector apparatus as claimed in claim 1 comprising a plurality of electrode pairs spaced at intervals along the length of the optical fibre, each electrode pair comprising first and second electrodes.

5. A radiation detector apparatus as claimed in claim 1 wherein the first and second electrodes are elongate electrodes that extend for at least part of the length of the fibre optic.

6. A radiation detector apparatus as claimed in claim 1 wherein the optical fibre is coupled to at least one of the first or second electrodes.

7. A radiation detector apparatus as claimed in claim 1 wherein the optical fibre comprises a coating or barrier layer to protect it from the electrical discharge that occurs in the presence of ionising radiation.

8. A radiation detector apparatus as claimed in claim 1 wherein the optical fibre comprises a coating or barrier layer to protect it from damage due to ionising radiation.

9. A radiation detector apparatus as claimed in claim 1 wherein the optical fibre comprises a coating or barrier layer to protect it and the first and/or second electrode is arranged within a cable structure with the optical fibre.

10. A radiation detector apparatus as claimed in claim 9 wherein the first and second electrodes are separated, in at least some sections, by a porous material to allow gas between the electrodes.

11. A radiation detector apparatus as claimed in claim 9 wherein there is at least one void between the first and second electrodes that can fill with gas.

12. A radiation detector apparatus as claimed in claim 9 wherein the first and second electrodes run through a series of cavities that, in use, contain gas.

13. A radiation detector apparatus as claimed in claim 12 wherein the cavities are arranged to have a size that leads to a particular resonance frequency.

14. A radiation detector apparatus as claimed in claim 1 wherein at least one of the first and second electrodes comprises a conductive wire.

15. A radiation detector apparatus as claimed in claim 1 wherein at least one electrode comprises a conductor with an arcuate cross section.

16. A radiation detector apparatus as claimed in claim 15 wherein the first electrode is formed as a tube.

17. A radiation detector apparatus as claimed in claim 16 wherein the first electrode is arranged to at least partially surround the optical fibre.

18. A radiation detector apparatus as claimed in claim 1 comprising at least one barrier layer between the gas separating the first and second electrodes and a direction of incidence for ionising radiation.

19. A radiation detector apparatus as claimed in claim 18 wherein the barrier layer has properties tuned to filter particular types of ionising radiation.

20. A radiation detector apparatus as claimed in claim 19 wherein the barrier layer varies along the length of the electrodes and optical fibre.

21. A radiation detector apparatus as claimed in claim 1 wherein the detector apparatus is configured to detect radiation via secondary ionisation.

22. A radiation detector apparatus as claimed in claim 21 comprising a material that responds to incident radiation by emitting ionising radiation.

23. A radiation detector apparatus as claimed in claim 22 comprising a neutron absorbing material which emits ionising radiation in response to neutron absorption.

24. A radiation detector apparatus as claimed in claim 23 comprising, over at least part of the sensor, a shielding layer that substantially blocks or attenuates other forms of ionising radiation.

25. A radiation detector comprising the apparatus as claimed in claim 1, an interrogator unit coupled to the optical fibre for performing distributed acoustic sensing on the optical fibre and circuitry for applying the potential difference to the first and second electrodes.

26. A radiation detector as claimed in claim 25 wherein the circuitry for applying the potential difference to the first and second electrodes is configured to modulate the applied potential difference over time.

27. A radiation detector as claimed in claim 26 wherein the potential difference is be periodically turned off or reduced to a low level which is insufficient to cause a cascade of charged particles in response to an ionisation event.

28. A radiation detector as claimed in claim 26 wherein the potential difference between the first and second electrodes is modulated over time so to determine spectroscopic information about any ionising radiation present.

29. A method of radiation detection comprising: applying a potential difference between first and second electrodes separated from one another in a gas, wherein the potential difference is sufficient such that ionisation of the gas causes a cascade of charged particles between the electrodes and, interrogating an optical fibre deployed adjacent said first and/or second electrodes to provide a distributed acoustic sensor; and monitoring said distributed acoustic sensor for signals associated with a cascade of charged particles.

\* \* \* \* \*